United States Patent [19]

Halbridge

[11] Patent Number: 5,202,707
[45] Date of Patent: Apr. 13, 1993

[54] FLAVORED BOOT FOR EYEGLASSES

[76] Inventor: Adam S. Halbridge, 431 Hedwig Rd., Houston, Tex. 77024

[21] Appl. No.: 632,923

[22] Filed: Dec. 24, 1990

[51] Int. Cl.⁵ .......................... G02C 5/14; G02C 1/00
[52] U.S. Cl. ................................ 351/123; 351/122; 351/158
[58] Field of Search .................. 351/41, 156, 157, 123, 351/158, 122; 2/448, 449, 450

[56] References Cited

U.S. PATENT DOCUMENTS 2,294,840  9/1942  Dunn .
2,436,101  2/1948  Dirlam et al. .
2,502,734  4/1950  Lyons .
3,582,192  6/1971  Gitlin .
3,684,356  8/1972  Bates .

*Primary Examiner*—Rodney B. Bovernick
*Attorney, Agent, or Firm*—Ben D. Tobor

[57] ABSTRACT

A flavored eyeglasses boot member is placed upon the end of an eyeglass temple arm, and the boot member is flavored with a fruit, candy, or spice flavor.

9 Claims, 2 Drawing Sheets

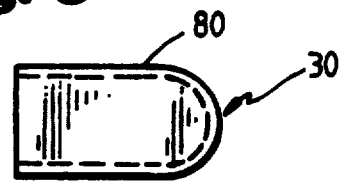
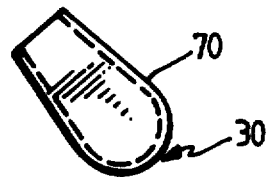
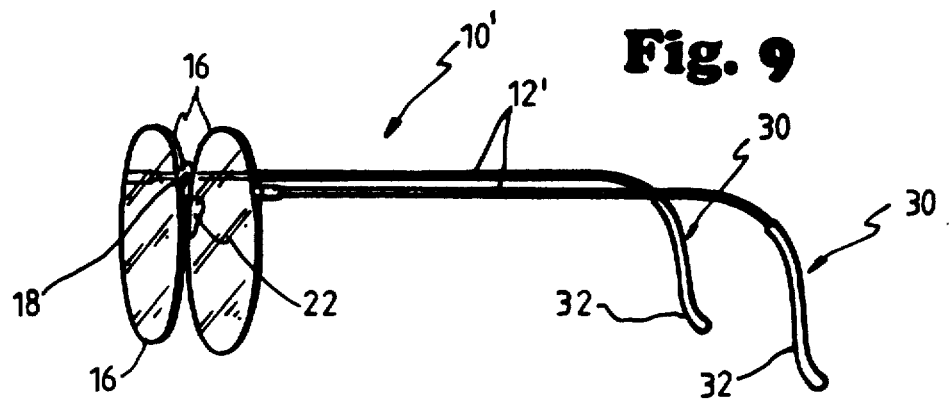
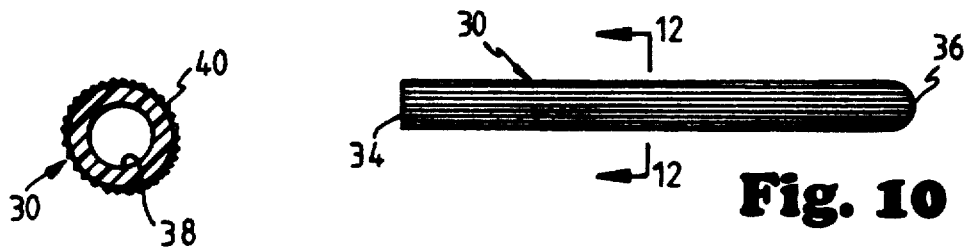
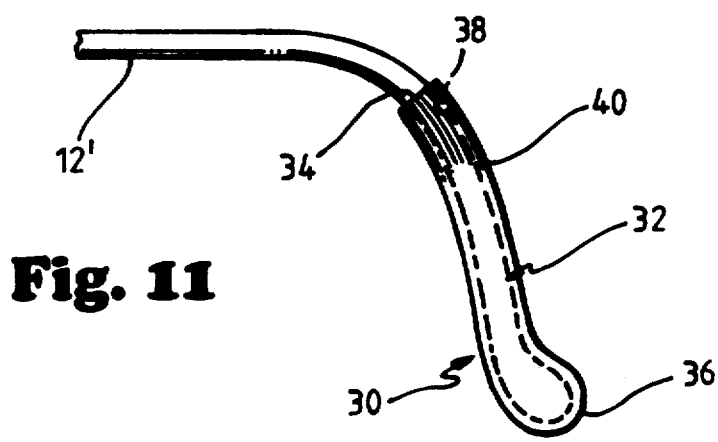

FLAVORED BOOT FOR EYEGLASSES

FIELD OF THE INVENTION

The invention relates to a flavored boot for eyeglasses, the boot being disposed upon an end portion of a temple arm for a pair of eyeglasses.

DESCRIPTION OF THE PRIOR ART

Many individuals who wear eyeglasses frequently will remove their eyeglasses and place the end of the temple arm into their mouth, and either chew or suck upon the end of the temple arm. Such actions, particularly chewing, can leave undesired indentations or scratches on the ends of the temple arms, which causes unsightly damage to their eyeglasses. When the eyeglasses wearer chews or sucks upon the ends of the temple arms, no taste, or flavor, is imparted to the eyeglasses wearer. It is believed that many adult wearers of eyeglasses, who do chew the ends of the temple arms of their eyeglasses, would enjoy having a desirable flavor imparted to them when they chew or suck upon the ends of the temple arms of their eyeglasses. It is believed that many younger children and teen-agers, who might not be wearing prescription eyeglasses, but rather sunglasses, would also enjoy having a desirable flavor imparted to them if they chew on the temple arms of their sunglasses. Additionally, it would be desirable to have something that would protect the material which forms a temple arm of eyeglasses to protect them teeth marks and scratches as previously described.

Accordingly, prior to the development of the present invention, there have been no eyeglasses which have a portion of the temple arm flavored with a desirable flavor, nor has there been a protector member, or boot, for the ends of temple arms of eyeglasses which is also flavored, whereby upon an eyeglasses wearer chewing or sucking upon the end of the temple arm of his eyeglasses, a flavor of the boot is imparted to the eyeglasses wearer.

Therefore, the art has sought eyeglasses having a portion of their temple arms flavored with a desirable flavor, and the temple arm being protected against teeth marks and scratches by a protector device, which also provides the imparting of a flavor to the eyeglasses wearer upon the eyeglasses wearer chewing or sucking upon the end of the temple arm of the pair of eyeglasses. The art has also sought such a device which is simple and economical to manufacture and use.

SUMMARY OF THE INVENTION

In accordance with the invention, the foregoing advantages have been achieved through the present flavored eyeglasses boot member for use with eyeglasses having temple arms attached to eyeglass frames, each of the temple arms having an end portion operable to engage the head of the eyeglasses wearer, the end portion having an outer surface. The present invention includes a generally tubular shaped member having inner and outer surfaces, at least a portion of the inner surface closely conforming to the outer surface of the temple arm end portion; and at least the outer surface of the tubular shaped member being flavored with a fruit, candy, or spice flavor, whereby upon an eyeglasses wearer chewing or sucking upon the outer surface of the tubular shaped member, the fruit, candy, or spice flavor is imparted to the eyeglasses wearer. A further feature of the present invention is that the boot member may be formed of a plastic material which is impregnated with the fruit, candy, or spice flavor. Another feature of the present invention is that the plastic material may be a flexible plastic material, or a rigid plastic material. An additional feature of the present invention is that the boot member may also be formed of an edible, dissolvable material which is impregnated with a fruit, candy, or spice flavor, whereby the boot member may be eaten by the wearer.

In accordance with the invention, the foregoing advantages have also been achieved through an improvement in eyeglasses having temple arms attached to eyeglass frames, each of the temple arms having an end portion operable to engage the head of the eyeglasses wearer. The improvement in eyeglasses, in accordance with the present invention, includes a boot member for at least one of the temple arm end portions, the boot member being flavored with a fruit, candy, or spice flavor, whereby upon an eyeglasses wearer chewing or sucking upon the boot member, the flavor of the boot member is imparted to the eyeglasses wearer. A further feature of the present invention is that the temple arm end portion has an outer surface, and at least a portion of the boot member closely conforms to the temple arm end portion outer surface.

The flavored eyeglasses boot member and improvement in eyeglasses, when compared with previously proposed prior art eyeglasses, have the advantages of: being simple and economical to manufacture and use; providing protection of the ends of the temple arm from tooth marks and scratches; and imparting a desired flavor to the eyeglasses wearer, upon the eyeglasses wearer chewing or sucking upon the temple arm end portions.

BRIEF DESCRIPTION OF THE DRAWING

In the drawings:

FIGS. 6–8 are side views of additional embodiments of flavored eyeglasses boot members in accordance with the present invention;

FIG. 9 is a perspective view of another pair of prior art eyeglasses, provided with another embodiment of flavored eyeglasses boot members in accordance with the present invention;

FIG. 10 is a top plan view of the flavored eyeglasses boot member illustrated in FIG. 9;

FIG. 11 is a side view of a portion of the temple arm of the eyeglasses of FIG. 9 being provided with a flavored eyeglasses boot member in accordance with the present invention: and FIG. 12 is a cross-sectional view of a flavored eyeglasses boot member in accordance with the present invention taken along line 12—12 in FIG. 10.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
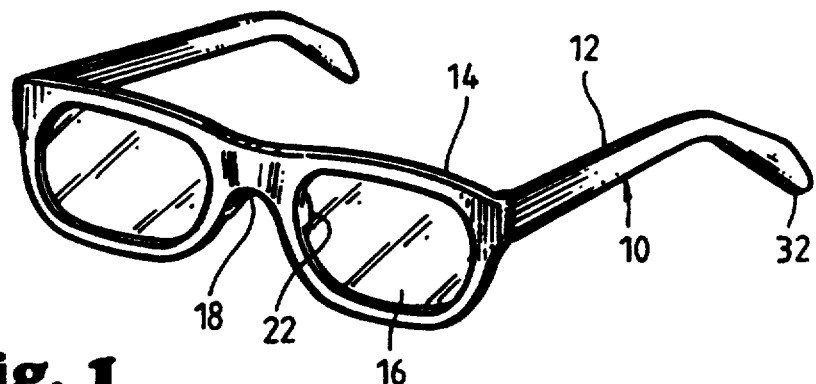
FIG. 1 is a perspective view of a conventional pair of eyeglasses.

With reference to FIG. 1, a conventional pair of eyeglasses 10 are shown. It should be noted that as used throughout this specification and claims, the term "eyeglasses" encompasses not only prescription eyeglasses, but also non-prescription eyeglasses and sunglasses. Eyeglasses 10 have temple arms 12 which are hingeably attached to eyeglass frame 14 and are rotatable with respect to the eyeglass frame. The eyeglass frame 14 contains lenses 16 and has a nose-bridging portion 18. The temple arms 12 are typically designed to extend to the top of, or beyond, the top of the ears of a wearer of the eyeglasses 10. As is conventional, the frame 14 has brackets, or nose portions, 22 which project toward the head of the wearer and are designed to rest on the side of the nose near the top of the wearer's nose. As is conventional in the art, eyeglass frame 14 and temple arms 12 are typically made of a suitable plastic or metallic material, or combinations thereof. When glasses 10 are worn, temple arms 12 typically engage the head of the eyeglasses wearer, and in particular end portions 32 of temple arms 12 engage the side of the head of the eyeglass wearer.

Figure 2:
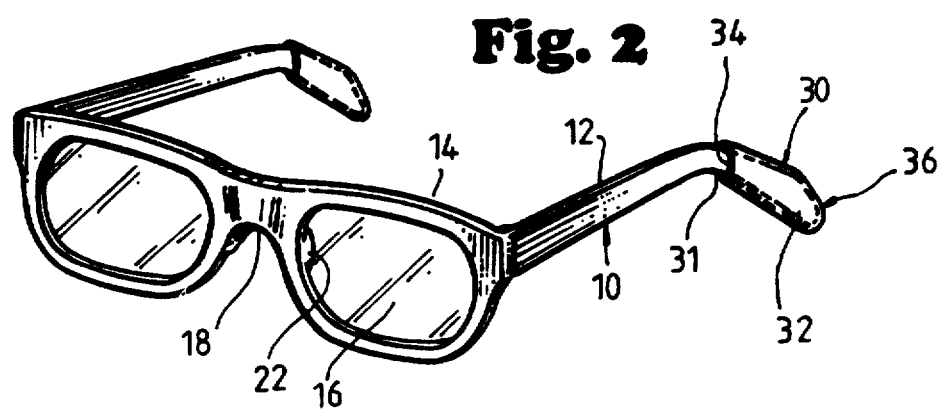
FIG. 2 is a perspective view of the eyeglasses of FIG. 1 provided with flavored eyeglasses boot members in accordance with the present invention.

With reference now to FIG. 2, eyeglasses 10 have been provided with flavored eyeglasses boot members 30 in accordance with the present invention. Boot members 30 have a generally tubular shaped configuration and include an open end portion 34 and a closed end portion 36. If desired, the closed end portion 36 may be deleted.

Figure 3:
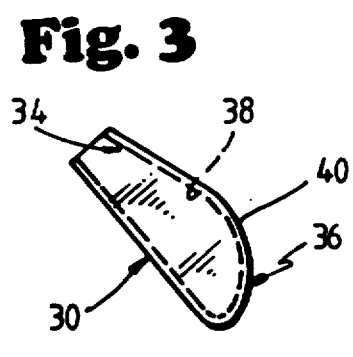
FIG. 3 is a side view of the flavored eyeglasses boot member illustrated in FIG. 2 in accordance with the present invention.

With reference to FIG. 3, boot member 30 includes an inner wall surface 38 and an outer wall surface 40. A portion of the inner wall surface 38 is preferably designed to fit snugly against, and closely conform to, the outer surface 31 of the temple arms 12 near the open end 34 of the boot member 30 in order to retain the boot member 30 at its desired location upon end portion 32 of temple arm 12. The inner wall surface 38 near the closed end portion 36 of boot member 30 does not necessarily have to fit as snugly against the outside surface 31 of the end portion 32 of temple arms 12.

Figure 4:
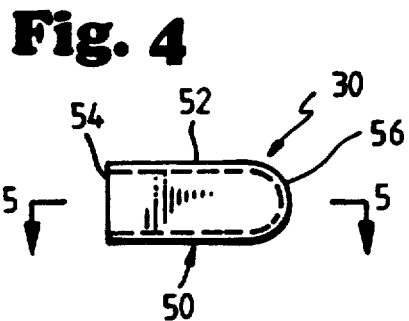
FIG. 4 is an alternative embodiment of a flavored eyeglasses boot member in accordance with the present invention.
Figure 5:
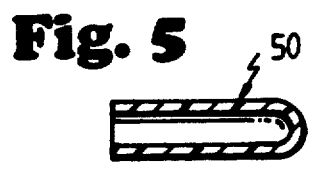
FIG. 5 is a cross-sectional view taken along line 5—5 of FIG. 4.

With reference to FIG. 4, another embodiment of boot member 30 is a generally tubular shaped member 52 having an open end portion 54 and a hemispherical end portion 56 closing the other end of member 52 of this embodiment 50 of boot member 30. Once again, if desired, the closed end portion 56 of embodiment 50 of boot member 30 can be deleted if desired.

Figure 6:
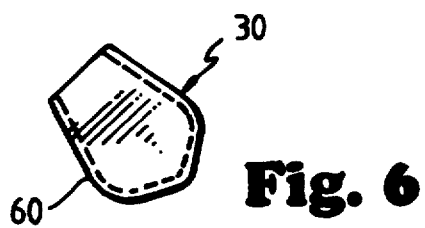

With reference to FIGS. 6-8, other embodiments, 60, 70, and 80 of flavored eyeglasses boot members 30 are illustrated, wherein the generally tubular shaped configuration of boot member 30 is somewhat changed, in order to accommodate the various shapes of conventional end portions 32 of eyeglass temple arms 12, but the configuration is still a generally tubular shaped configuration.

With reference to FIG. 9, another type of eyeglasses 10', which are generally referred to as wire rim glasses, are shown provided with flavored eyeglass boot members 30 in accordance with the present invention. Identical reference numerals have been used in FIG. 9 for the same components as previously described in connection with FIGS. 1 and 2. Glasses 10' primarily differ from the glasses 10 of FIGS. 1 and 2, in that temple arms 12' are typically narrow wire members having either a round or rectangular cross-sectional configuration, as is well known in the art. With reference to FIGS. 10-12, flavored eyeglasses boot member 30 is also a generally tubular shaped member having an open end 34, closed end 36, and inner and outer wall surfaces 38, 40. If desired, end portion 36 could be left open, as is open end portion 34, if desired.

With reference to all of the flavored eyeglasses boot members 30 illustrated in FIGS. 2-12, at least the outer surfaces 40 of each boot member is flavored with a fruit, candy, or spice flavor, as will be hereinafter described in greater detail, whereby upon an eyeglasses wearer chewing or sucking upon the outer surface 40 of the boot members 30, the fruit, candy, or spice flavor is imparted to the eyeglasses wearer. As will be hereinafter described in greater detail, in the case of boot members 30 being formed of a non-dissolvable material, boot members 30 also protect the end portions 32 of temple arms 12 from having teeth marks or scratches imparted to the end portions 32 of temple arms 12.

Flavored eyeglasses boot members 30 may be formed of a suitable plastic or plastic-like material, such as polyvinyl chloride, polyethylene, TEFLON, rubber, or synthetic rubber material, which are impregnated with the desired flavor. Any suitable plastic or plastic-like material may be utilized provided it is non-toxic and can be impregnated with the desired flavor. For example, children might have a preference for a fruit or candy flavor for the boot members 30, whereas an adult wearer might prefer a spice flavor, such as cinnamon or jalapeno flavors. When boot members 30 are formed of a flexible plastic, or plastic-like material, which has been impregnated with the desired flavor, the boot member 30 may be slipped over the end portion 32 of temple arms 12. Thus, when the wearer of glasses 10 chews upon the outer surface of boot members 30, the desired flavor will be imparted to the wearer, and the outer surface 31 of temple arm 12 is protected from teeth marks and scratches.

Alternatively, boot members 30 could be formed of a relatively rigid plastic material which can be cast about the end portion 32 of temple arms 12. Such materials could include any conventional rigid plastic material. Alternatively, boot members 30 could be formed of an edible, dissolvable material which is impregnated with the fruit, candy, or spice flavor, whereby upon the eyeglasses wearer chewing or sucking upon the boot member 30, boot member 30 would dissolve over time, as the wearer eats the boot member 30. Suitable edible, dissolvable materials would include licorice, taffy, or licorice like, or taffy-like material, as well as any other non-toxic, edible material which can be impregnated with the desired flavor, and may be eaten by the wearer of the glasses 10, without harmful side effects.

It is to be understood that the invention is not limited to the exact details of construction, operation, exact materials or embodiments shown and described, as obvious modifications and equivalents will be apparent to one skilled in the art; for example, the boot members could be formed of edible wax which is impregnated with the desired flavor. Accordingly, the invention is therefore to be limited only by the scope of the appended claims.

I claim:

1. In eyeglasses having temple arms attached to eyeglass frames, each of said temple arms having an end portion operable to engage the head of the eyeglasses wearer, the improvement comprising:

a boot member for at least one of the temple arm end portions, the boot member being impregnated with a fruit, candy, or spice flavor, whereby upon an eyeglasses wearer chewing or sucking upon the boot member, the flavor of the boot member is imparted to the eyeglasses wearer.

2. The boot member of claim 1, wherein the temple arm end portion has an outer surface and at least a portion of the boot member closely conforms to the temple arm end portion outer surface.

3. The boot member of claim 1, wherein the boot member is formed of a plastic material which is impregnated with the fruit, candy, or spice flavor.

4. The boot member of claim 3, wherein the plastic material is a flexible plastic material.

5. The boot member of claim 3, wherein the plastic material is a rigid plastic material.

6. The boot member of claim 1, wherein the boot member is formed of an edible, dissolvable material which is impregnated with the fruit, candy, or spice flavor, whereby the boot member may be eaten by the wearer.

7. For use with eyeglasses having temple arms attached to eyeglass frames, each of the temple arms having an end portion operable to engage the head of the eyeglasses wearer, the end portion having an outer surface, a flavored eyeglasses boot member comprising:

a generally tubular shaped member formed of a plastic material having inner and outer surfaces, at least a portion of the inner surface closely conforming to the outer surface of the temple arm end portion; and at least the outer surface of the tubular shaped member being impregnated with a fruit, candy, or spice flavor, whereby upon an eyeglasses wearer chewing or sucking upon the outer surface of the tubular shaped member, the fruit, candy, or spice flavor is imparted to the eyeglasses wearer.

8. The flavored eyeglasses boot member of claim 7, wherein the plastic material is a flexible plastic material.

9. The flavored eyeglasses boot member of claim 7, wherein the plastic material is a rigid plastic material.

* * * * *